June 2, 1959   H. F. GATES   2,888,954
LAMINATED PLASTIC PIPE
Filed Sept. 9, 1955

HARRY F. GATES
deceased, by
MITTEN HOWELL GATES
JOHN G. GATES
CHARLES C. GATES, JR.
Executors
INVENTOR.

BY
Horace B. Van Valkenburgh
ATTORNEY

United States Patent Office 2,888,954
Patented June 2, 1959

2,888,954

LAMINATED PLASTIC PIPE

Harry F. Gates, deceased, late of Denver, Colo., by Mitten Howell Gates, John G. Gates, and Charles C. Gates, Jr., executors, Denver, Colo.

Application September 9, 1955, Serial No. 533,391

15 Claims. (Cl. 138—55)

This invention relates to laminated articles and to methods for manufacturing the same. More particularly, this invention relates to a plastic pipe, i.e., laminated flexible conduit structure of thermoplastic materials, which may include reinforcing material.

Plastic pipe differs from hose inasmuch as it is designed for a basically different type of service. Such plastic pipe finds use in many applications which heretofore have been limited to the use of metal pipe, such as iron and copper, in installations of a more or less permanent nature. Plastic pipe is much less flexible than hose, but is also subject to many types of chemical attack due to the type of service for which it is used. Polyethylene has been found to possess chemical and physical properties which made this material well suited for flexible plastic pipe.

Up to the present time, plastic pipe manufactured from polyethylene has been in the form of a single tube, unreinforced, such as is obtained from a simple extrusion process. The polyethylene used is normally a pure material compounded with carbon black to provide a resulting pipe with adequate resistance to deterioration by sunlight. Other compounding ingredients than carbon black are generally not used, inasmuch as such pipe must often carry potable water for domestic puposes, and therefore must remain free of contamination.

One disadvantage of plastic pipe, such as described above, is that the entire pipe must be extruded from pure polyethylene, thereby precluding the use of scrap material which may have become contaminated with materials which could conceivably dissolve out into the fluid being carried. However, use of pure polyethylene increases the cost of the pipe accordingly.

Further disadvantages of such pipe result from the fact that the pipe is not reinforced. This leads to excessively low burst pressure, poor temperature sensitivity, and increased stress and fatigue cracking.

It is an object of this invention to provide a novel plastic pipe; to provide such a pipe wherein the inner portion is composed of pure material and the outer or cover portion is composed of scrap material; to provide a plastic pipe wherein the outer cover is specifically compounded to obtain resistance to weathering without affecting the purity of the material making up the inner portion of the pipe; and to provide a plastic pipe having increased resistance to bursting, temperature change, and to stress and fatigue cracking.

Other objects and advantages of the invention will become apparent from the description which follows, taken in connection with the accompanying drawing, in which.

Figure 1:
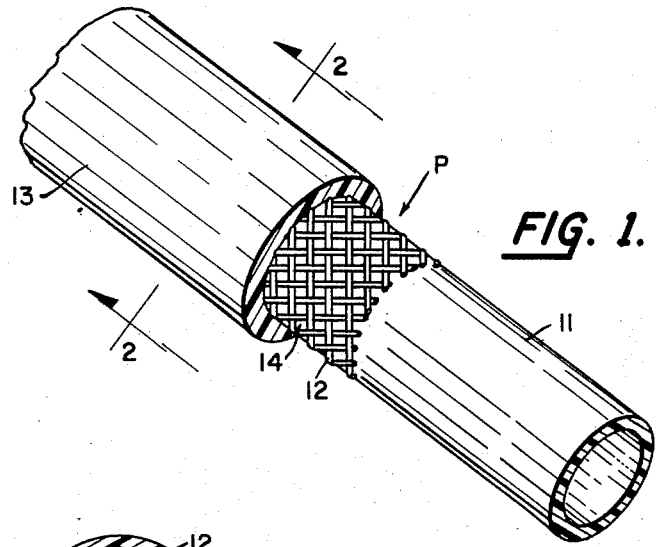
Fig. 1 is a perspective view of a length of a reinforced plastic pipe constructed in accordance with this invention, with certain portions being shown as removed to illustrate the interior more clearly.

Referring now to Fig. 1, a plastic pipe P constructed in accordance with this invention may consist of an inner tube 11, a reinforcement layer 12 and an outer cover 13. Inasmuch as such a pipe is sometimes used to carry potable water, tube 11 is composed of pure polyethylene. Titanium dioxide or similar material may be compounded into the tube 11, if desired, to produce a white color which would easily show up the presence of any foreign substance. Since tube 11 is not subjected to wear in the same manner as the outside of the pipe, it may be extruded so as to be as thin-walled as is practical in order to conserve use of the relatively expensive, pure polyethylene material. In practice, thickness of the tube 11 is preferably a maximum of about one-third the thickness of the cover 13. A layer 12 of reinforcing material may next be braided or otherwise suitably applied to the outside of tube 11. The material 12 is preferably fiber glass, but may also be any of the well-known reinforcing yarns or cords, such as nylon, rayon and cotton.

A polyethylene cover 13 is then extruded over the reinforcing layer 12. The cover 13 necessarily is subjected to appreciable weathering and possible deterioration from many sources, and therefore is compounded accordingly. Thus, carbon black may be incorporated in cover 13 to prevent light penetration and consequent deterioration, while suitable antioxidants may also be used, if desired, to assist in eliminating oxidation. Inasmuch as the cover 13 does not come into contact with the fluid being conveyed through the tube 11, the cover 13 may be substantially wholly or largely made of relatively cheap scrap material. However, it may further be desirable to compound into the cover approximately five percent of a Butyl type rubber to increase flex crack resistance. A Butyl type rubber may be defined as one of the isoolefindiolefin copolymer, synthetic rubbers, which are rubbery hydrocarbon copolymers prepared by low temperature copolymerization of a major proportion of an isoolefin having from four to seven carbon atoms with a minor proportion of an open-chain or linear conjugated diolefin having from four to eight carbon atoms.

Due to the inert nature of polyethylene, there are no known adhesives which may be used to bond together the various elements of pipe P. A satisfactory mechanical or physical bond must therefore be obtained. Depending on the amount and severity of the flexing the pipe must withstand, it may or may not be necessary to bond the tube 11 to the cover 13. For light service, where little or no flexing will be encountered, it is unnecessary to bond the tube 11 to the cover 13, so that the reinforcement 12 may be allowed to float in between, as it were. For service in which a small amount of flexing is to be encountered, it becomes more desirable to obtain a bond between the tube 11 and cover 13. This may be accomplished by applying cover 13 at a sufficiently high temperature to allow the cover 13 to flow through the openings or interstices 14 in the braid pattern and fuse to tube 11. Thus, the layer 12, while not bonded to either tube 11 or cover 13, is nevertheless effectively sealed in its position. An even stronger pipe may be obtained, for use in severe service, by treating the fibers or the like which form layer 12 with liquid polyethylene prior to wrapping braid layer 12 onto the tube 11. Such pretreatment appears to provide a mechanical bond between layer 12 and the liquid polyethylene with which the layer 12 is treated. In this instance, cover 13 is again applied at a high temperature to mutually bond together tube 11, cover 13, and the polyethylene on the treated braid layer 12. An excellent mechanical bond is thereby mutually obtained between tube 11, braid layer 12 and cover 13.

Figure 3:
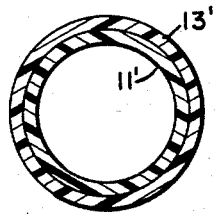
Fig. 3 is a cross-section similar to Fig. 2, but showing an unreinforced plastic pipe.

In Fig. 3 is shown a cross section through a pipe similar to that of Fig. 1, except that the pipe is not provided with a reinforcing layer. In manufacturing this pipe, tube 11 is extruded in the usual manner, following which the cover 13' is extruded over tube 11. Cover 13' is applied at a sufficiently high temperature to cause cover 13' to fuse with and bond to tube 11. By proper compounding, cover 13' can be made to withstand the weathering conditions to which it will be exposed. Scrap material may also be used in the cover 13', inasmuch as the cover will not come in contact with the fluid flowing through the pipe, which thereby results in a considerable cost reduction. Thus, tube 11 is again a relatively thin layer, having a thickness on the order of one-third or less the thickness of cover 13'. Due to the fact that tube 11 contacts the fluid flowing through the pipe, pure polyethylene must be used. This may be compounded with a coloring agent, such as titanium dioxide, to show up the presence of dirt or foreign material within the tube 11.

Figure 4:
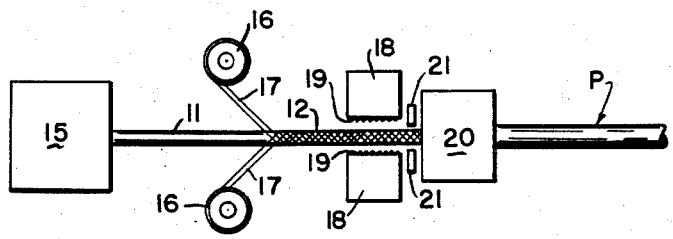
Fig. 4 is a diagrammatic elevation of one type of apparatus conveniently used in making the pipe of Fig. 1.

As illustrated in Fig. 4, a plastic pipe of this invention may be made by use of the apparatus shown, by which the method of this invention is particularly adapted to be carried out. The inner tube 11 may be formed by a suitable extrusion press or machine 15, from which the tube 11 may pass continuously to suitable wrapping or braiding apparatus, such as including rolls 16 from which threads 17 or the like are wrapped or braided onto tube 11 to form the layer 12. As indicated previously, threads 17 may be fiber glass or may be threads or cords or the like of other suitable material, such as nylon, rayon or cotton. Rolls 16 may be rotated or oscillated about tube 11 in a conventional manner, to form a suitable braid pattern or the like. Following the application of the layer 12, the outer surface of tube 11 may be heated, as by heating heads 18 adapted to direct flames 19 toward tube 11 to heat the same, it being noted that when layer 12 is formed of fiber glass, the latter will be unaffected by flames. However, any other suitable heating device, such as electrically operated, as heating coils, infra red lamps or the like, particularly when the layer 12 is formed of material which might be damaged by flames, may be used. Nevertheless, flame heating appears to have certain advantages, since the flames should be reducing in character, so as to reduce the oxide layer on the outside of the inner tube, since the absence of an oxide layer or reduction in oxide content results in an increase in the strength of the mechanical bond produced when the outer covering is applied.

Figure 2:
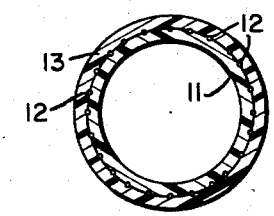
Fig. 2 is a cross-section taken along line 2—2 of Fig. 1.

The heated assembly passes to an annular extruder 20, having an annular orifice which applies the outer covering 13 of Figs. 1 and 2 to the heated assembly. The material supplied to extruder 20, as indicated previously, is compounded substantially wholly or at least in substantial part from used or scrap polyethylene, together with such additives as desired, such as to produce resistance to deterioration from the effect of light rays, antioxidants and a polymerizing reagent. Also, either before or after heating, liquid polyethylene may be applied to the threads 17 or the layer 12, as by spray heads 21, although the same may be omitted when desired. If desired, the pipe P, after it leaves the extruder 20, may be subjected to heat treating and then cooled in a conventional manner.

Polyethylene has been found to exhibit its greatest strength in the direction of orientation of the crystalline structure therein, while directional orientation of the crystalline structure has been found to be conveniently produced in the direction of a stress applied during or shortly after extrusion. Thus, if the inner tube 11 is expanded in size to produce a circumferential stress, either as it leaves extruder 15 or shortly thereafter, the inner tube 11 will tend to exhibit its maximum strength in a circumferential direction, apparently due to crystalline orientation in that direction. Such circumferential stress may be produced by a mandrel within the tube 11, positioned beyond the discharge side of extruder 15, by pressure of air or other suitable fluid within the tube, or in any other suitable manner. Also, it may be found that for many purposes, the circumferential stress produced by heating, as by flames 19 may be sufficient to produce the desired circumferential crystalline orientation. That is, the flames or heating by other means will cause at least the outer portion of the tube to tend to expand, but this expansion will be resisted to a certain degree by the inner portion of the tube and also by the reinforcing layer 12, with a resultant production of a circumferential stress, such stress being primarily in compression rather than in tension, as when the circumferential stress is produced by circumferential expansion of the tube, as by a mandrel, fluid pressure inside the tube or the like. Also, if the outer cover 13 is subjected to a longitudinal stress, as by being drawn down by a longitudinal pull thereon as the assembly leaves extruder 20, the outer cover 13 will tend to have its greatest strength in a longitudinal direction, apparently due to the resultant longitudinal crystalline orienation from the longitudinal stress, while inner tube 11 will tend to have its greatest strength in a circumferential direction, so as to resist the pressure within the pipe. Thus, a combination of resistance to longitudinal stress, by outer cover 13, and resistance to circumferential stress, by inner tube 11, is thereby produced which should resist stresses encountered in use to a highly satisfactory extent.

If desired, inner tube 11 may be stressed longitudinally and outer cover 13 stressed circumferentially. For this purpose, the orifice through which inner tube 11 is extruded may produce an annulus having a larger diameter and greater wall thickness than finally desired, so that a longitudinal pull on the tube as it is extruded will reduce the diameter and wall thickness to that desired and simultaneously produce a longitudinal stress which will produce a longitudinal crystalline orientation and therefore provide greater strength in a longitudinal direction. When the outer covering 13 is applied, instead of being extruded axially, the compounded polyethylene may be extruded through a crosshead, which causes the material to be applied circumferentially or at right angles to the tube 11. This right angle application should produce a certain degree of circumferential stress which should result in a corresponding crystalline orientation and resultant increase in strength circumferentially. Of course, the inner tube 11 may be stressed and thereby strengthened and the outer covering merely extruded thereover, reliance being placed on the reinforcing layer 12 to assist sufficiently to resist bursting stresses within the pipe.

It will be understood, of course, that additional layers, conveniently made largely of scrap or used polyethylene, may be interposed beyond the inner tube 11 and the outer covering 13 and that these layers may be applied by extrusion or by wrapping a sheet of polyethylene about the inner tube or a preceding layer. When such sheets are wrapped, either spirally or as a so-called "jacket" wrap, such a layer may be heated and stressed in a circumferential direction to produce increased circumferential strength, presumably due to crystalline orientation.

From the foregoing description, it will be apparent that no unusual equipment is necessary to practice the method of this invention, since apparatus used to produce similar products is suitable for use with this invention. However, a new article has been produced by a new method to meet a need that heretofore has been impossible to fulfill.

What is claimed is:

1. A method of manufacturing a plastic pipe, which comprises compounding substantially pure or unused polyethylene and extruding the same to form a tube; and compounding polyethylene wholly or substantially partly from used or scrap polyethylene and extruding the same into fused unitary relation with said inner tube.

2. A method of manufacturing a plastic pipe, as defined in claim 1, which includes applying a reinforcing layer of fiber and the like material on said inner tube prior to extruding said outer covering thereon.

3. A method of manufacturing a plastic pipe, as defined in claim 2, which includes forming said reinforcing layer of fiber glass.

4. A plastic pipe comprising an inner tube formed of material compounded from new and unused polyethylene; and an outer covering surrounding said inner tube formed of material compounded at least in a substantial part from used or scrap polyethylene, one of said inner tube and outer covering being provided with longitudinal crystalline orientation and the other of said inner tube and outer covering being provided with circumferential crystalline orientation.

5. A method of manufacturing a plastic pipe, which comprises compounding substantially pure or unused polyethylene and extruding the same to form an inner tube; applying a reinforcing layer of fiber and the like material on said inner tube; heating said inner tube and reinforcing layer; applying liquid polyethylene to said reinforcing layer and extruding an outer covering surrounding said inner tube from polyethylene compounded wholly or substantially partly from used or scrap polyethylene.

6. A method of manufacturing a plastic pipe, which comprises compounding substantially pure or unused polyethylene and extruding the same to form an inner tube; heating said inner tube; and extruding an outer covering surrounding said inner tube from polyethylene compounded wholly or substantially partly from used or scrap polyethylene, within a sufficient time after the said heating so as to cause said outer cover to fuse at least partially to said inner tube.

7. A method of manufacturing a plastic pipe, as defined in claim 6, which includes applying a reinforcing layer of fiber and the like material on said inner tube prior to extruding said outer covering thereon.

8. A method of manufacturing a plastic pipe, which comprises extruding polyethylene to form a tube; separately extruding polyethylene to form an outer covering surrounding said tube; stressing one of said inner tube and outer covering longitudinally at least while still heated following extrusion; and stressing the other of said inner tube and outer covering circumferentially at least while still heated following extrusion.

9. A method of manufacturing a plastic pipe, as defined in claim 8, which includes heating said inner tube prior to extruding said outer cover therearound so as to fuse said outer cover at least partially to said inner tube.

10. A plastic pipe comprising an inner tube and an outer covering surrounding the said inner tube, each formed of material compounded from polyethylene, one of said inner tube and outer covering being provided with longitudinal crystalline orientation and the other of said inner tube and outer covering being provided with circumferential crystalline orientation.

11. A plastic pipe comprising an inner tube layer of polyethylene and an outer covering layer of polyethylene, said outer covering being extruded into fused unitary relation with said inner tube layer, and with the polyethylene material for each layer being of a different composition to provide for the desired characteristics in each layer.

12. A plastic pipe as defined in claim 11, wherein said inner tube is composed of new and unused polyethylene, and said outer covering is composed at least in part of used or scrapped polyethylene.

13. A plastic pipe as defined in claim 12, wherein the material of said inner tube has incorporated therein a white coloring material and the material of said outer covering contains a material producing resistance to deterioration from light.

14. A plastic pipe comprising an inner tubing layer of polyethylene, a layer of open reinforcing material surrounding said inner tube, and an outer covering of polyethylene surrounding said reinforcing layer and extending through the openings in said reinforcing material said outer covering being extruded into fused unitary relation with said inner tube throughout the length thereof.

15. A plastic pipe as defined in claim 14, wherein said reinforcing material is provided with a coating of polyethylene to which said outer covering is fused.

References Cited in the file of this patent

UNITED STATES PATENTS

| | | |
|---|---|---|
| 2,364,332 | Wilkinson | Dec. 5, 1944 |
| 2,383,733 | Parker | Aug. 28, 1945 |
| 2,525,070 | Greenwald et al. | Oct. 10, 1950 |
| 2,645,249 | Davis et al. | July 14, 1953 |
| 2,648,720 | Alexander | Aug. 11, 1953 |
| 2,652,093 | Burton | Sept. 15, 1953 |
| 2,653,887 | Slayter | Sept. 29, 1953 |
| 2,674,297 | Greenwald | Apr. 6, 1954 |
| 2,690,769 | Brown | Oct. 5, 1954 |
| 2,766,806 | Rothermel et al. | Oct. 16, 1956 |